United States Patent [19]

Pierick

[11] 4,378,729

[45] Apr. 5, 1983

[54] APPARATUS FOR PREPARING PIZZA IN A BAKING OVEN

[76] Inventor: Richard L. Pierick, 3256 Hampshire Ave., North, Minneapolis, Minn. 55427

[21] Appl. No.: 329,815

[22] Filed: Dec. 11, 1981

Related U.S. Application Data

[63] Continuation-in-part of Ser. No. 261,511, May 7, 1981.

[51] Int. Cl.³ .............................................. A47J 37/00
[52] U.S. Cl. ............................... 99/400; 99/DIG. 15; 99/401; 99/446; 99/447; 126/275 R; D7/357
[58] Field of Search ................. 99/446, 447, DIG. 15, 99/400, 401; 426/523; 126/21 R, 275 R; D7/85, 96, 129

[56] References Cited

U.S. PATENT DOCUMENTS

| | | | |
|---|---|---|---|
| 1,316,365 | 9/1919 | Jackson | 99/450 |
| 1,512,482 | 10/1924 | Patterson | 219/368 |
| 1,862,420 | 6/1932 | O'Brien | 99/447 X |
| 1,956,387 | 4/1934 | Hartman | 99/446 |
| 2,456,988 | 12/1948 | Pierson | 99/446 |
| 2,742,850 | 4/1956 | Lafond | 99/446 |
| 3,040,651 | 6/1962 | Nolte | 99/446 |
| 3,088,393 | 5/1963 | Huckabee | 99/340 |
| 3,292,528 | 12/1966 | Myler | 99/446 |
| 3,301,172 | 1/1967 | Haro | 99/446 |
| 3,347,181 | 10/1967 | Pizzo | 99/450 X |
| 3,623,423 | 11/1971 | Berger | 99/446 |
| 3,704,142 | 11/1972 | Wilson | 99/446 |
| 3,745,912 | 7/1973 | Field | 99/446 |
| 3,793,936 | 2/1974 | Wills | 99/450 X |
| 3,847,069 | 11/1974 | Guibert | 99/443 R |
| 3,972,318 | 8/1976 | Lenoir | 99/446 X |
| 4,184,421 | 1/1980 | Ahlgren | 99/450 |

FOREIGN PATENT DOCUMENTS

| | | | |
|---|---|---|---|
| 537638 | 11/1931 | Fed. Rep. of Germany | 99/447 |
| 225971 | 5/1943 | Switzerland | 99/447 |

Primary Examiner—Billy J. Wilhite
Attorney, Agent, or Firm—James V. Harmon

[57] ABSTRACT

A method is provided for uniformly heating chilled pizza within an oven by supporting the pizza in a horizontal position, guiding or directing a stream of hot air upwardly onto the center of the pizza while shielding its periphery from radiation emanating from the oven heat source. An oven appliance is provided including a grill portion at the top composed of openwork for supporting the pizza and a connected, usually integral base spaced below the outer, i.e. periferal portion of the grill and a baffle having a central vent opening for funneling a stream of hot air upwardly onto the middle of the lower surface of the pizza. The baffle also acts as a heat shield interposed between the infrared radiating heat source and the periphery of the pizza. The grill portion preferably comprises a plurality of vertically disposed radially arranged flanges or webs extending upwardly from the baffle and having coplanar upper edges defining a food support surface.

14 Claims, 6 Drawing Figures

APPARATUS FOR PREPARING PIZZA IN A BAKING OVEN

This is a continuation-in-part of my prior application Ser. No. 261,511 filed May 7, 1981.

FIELD OF THE INVENTION

The invention relates to food preparation and more particularly to an apparatus for heating fresh or frozen foods in a baking oven.

THE PRIOR ART

It is well known that pizzas have become an extremely popular American food. Whether freshly prepared or frozen, the pizza prior to serving is placed on an oven rack and is allowed to cook by the normal operation of the oven. The pizza is thus cooked by both radiation and convection. However, there is not much air movement within a conventional oven. An important deficiency in cooking a pizza in this way is that the outer edge tends to be overdone while the center may remain relatively cool and underdone. In an extreme situation, the outer edge becomes scorched or burned while the center remains cool. Another problem is that liquid dripping from the pizza during the cooking operation collects in the oven. Attempts have been made to provide various kinds of cooking sheets for food products such as pizza but they do not provide the advantages of uniform heating and durability.

One of the problems that occurred in developing the present invention was the provision of an oven appliance with a grill and connected pan that can still be cleaned easily. A further problem was the provision of an oven appliance with means for supporting the pizza a predetermined distance above the base of the unit to achieve the required performance characteristics. A further problem was the provision of an oven appliance that provided means to help cut the pizza into equal portions.

OBJECTS

In view of these and other deficiencies of the prior art, it is an object of the present invention to provide an improved oven appliance with the following characteristics and advantages:

(a) The provision of an effective means for heating pizza in an oven such as a baking oven of the kind commonly found in the home that will heat a pizza uniformly and without either burning the edge or allowing the center section to remain cold.

(b) The provision of an apparatus heating pizza that will provide more color uniformity so that all portions of the pizza appear evenly and uniformly browned following heating.

(c) A provision for shielding portions of the pizza and at the same time catching drippings that would otherwise fall into the oven.

(d) The provision of an oven appliance for heating pizza that is rugged in construction, can be manufactured at low cost, is simple to use and can be easily cleaned.

(e) The provision of an appliance of the type described having a base comprising an air baffle with a vent opening near the center and connected raised grill members defining a food support surface to hold the pizza.

(f) An effective provision for uniformly heating pizzas by providing appliances of two or more sizes each producing a rising air current of a different diameter to thereby match the size of the pizza.

THE FIGURES

SUMMARY OF THE INVENTION

A method is provided for uniformly heating fresh or frozen pizza within an oven by supporting the pizza in a horizontal position, directing a stream of hot air upwardly onto the center of the pizza to reduce the adhered boundary air layer preferably while shielding its periphery from radiation emanating from the oven heat source. An oven appliance is provided including a grill composed of openwork composed of vertical risers for supporting the pizza and a base connected to the risers and spaced below the outer portion of the grill. The base comprises a baffle having a central vent opening for funneling a stream of hot air upwardly onto the middle of the lower surface of the pizza. The baffle also acts as a shield interposed between the infrared radiating heat source and the periphery of the pizza.

More specifically, in accordance with the present invention, a baking oven is used such as a domestic oven with a heat source at the bottom. The heat source within the oven is energized preferably to preheat the oven before heating the pizza, e.g. 400° F. for 10 minutes. The pizza is placed in a horizontal plane in the oven and is supported throughout its entire width and breadth at a point in the oven above the heat source while the entire lower surface of the pizza has free access to the air moving within the oven. The peripheral edge portion of the pizza is shielded from direct exposure to infrared radiation from the heat source located below it. At least part of the air rising upwardly from the heat source within the oven is guided or ducted toward the center of the pizza while the pizza is located over the middle of the ducted air column. This provides a rising column of hot air smaller in diameter than the diameter of the pizza. The air stream impinges against the lower surface of the pizza at substantially its center to disrupt the adhered boundary layer air on the lower surface, then spreads radially outwardly in a horizontal plane across the lower surface of the pizza and flows upwardly around the shielded peripheral edge thereof toward the top of the oven. It was found that this heats the pizza uniformly without either the presence of an underdone center or an overly cooked peripheral edge.

The invention also provides an improved oven appliance including a grill composed of openwork for supporting the pizza and a connected usually integral base spaced below the outer i.e. periferal portion of the grill and composed of a baffle having a central vent opening for funneling a stream of hot air upwardly onto the middle of the lower surface of the pizza. The baffle also acts as a heat shield interposed between the infrared radiating heat source and the periphery of the pizza.

DETAILED DESCRIPTION

Figure 1:
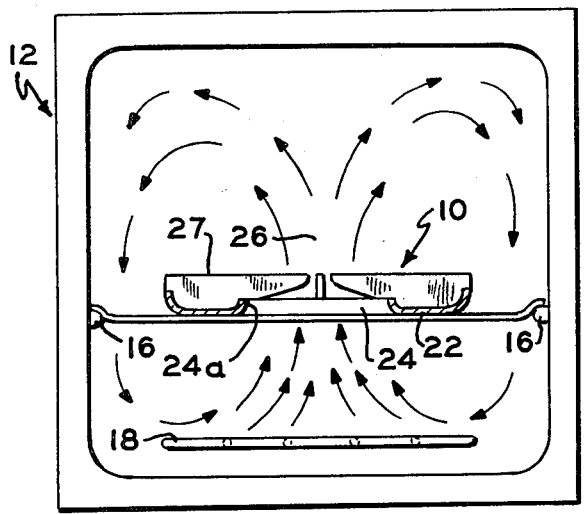
FIG. 1 is a crossectional view of an oven appliance as it appears within the oven before use taken on line 1—1 of FIG. 4.
Figure 2:
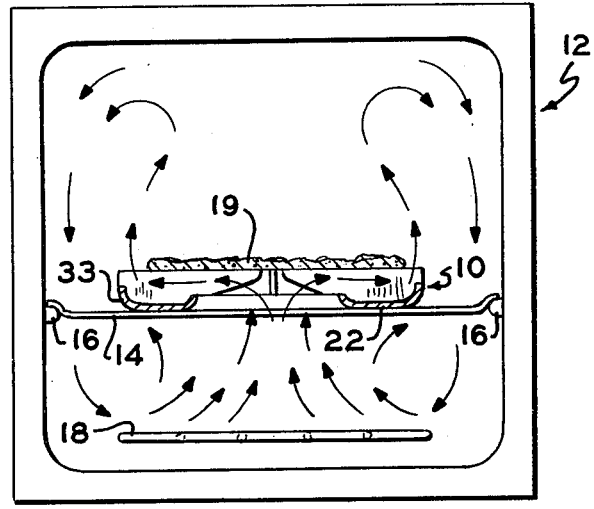
FIG. 2 is a view of similar FIG. 1 as the appliance appears after the pizza has been put in place for heating on line 2—2, FIG. 4.
Figure 3:
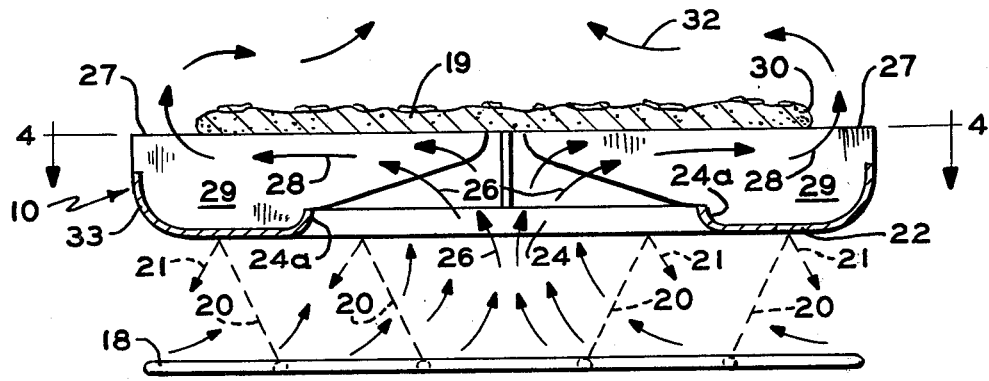
FIG. 3 is a diagrammatic side elevational view partly in section illustrating the principle of operation taken on line 3—3 of FIG. 4.

Refer now to FIGS. 1 through 3 which illustrate the principle of operation of the invention.

As seen in FIGS. 1 and 2 an oven appliance 10 is provided in accordance with the present invention. During operation the appliance 10 is placed in an oven 12 such as an ordinary domestic baking oven on an existing oven rack 14 supported by lugs 16. At the bottom of the oven is provided a heat source 18 which ordinarily comprises either a gas burner or an electrical resistance heater that radiates infrared radiation as indicated diagrammatically by dotted lines 20 and FIG. 2.

In accordance with the method of the present invention, a pizza 19 is heated uniformly by placing the pizza in a horizontal position and supporting it throughout its entire width and breadth at a point within the oven above the heat source 18. The lower surface of the pizza is exposed to free access by air currents moving within the oven. Supporting the pizza is an oven appliance which includes a base comprising a baffle 22 composed of a circular ring shaped section of sheet metal or molded metal e.g. cast iron or aluminum which also serves as a means for shielding the peripheral edge of the pizza from direct exposure to infrared radiation coming from heat source 18 located below it. Within the center of the baffle 22 is a vent opening 24 having an upwardly and centrally curved fairing 24a for funneling hot air upwardly from the heat source 18 as a column indicated at 26 toward the middle of the pizza while the pizza is centered over the ducted air to thereby provide a fast rising column of hot air smaller in diameter than the pizza itself. This rising column of air impinges against the lower surface of the pizza at substantially its center to disrupt the adhered boundary layer air on the lower surface. The hot air then spreads radially outward as shown by arrows indicated at 28 in a horizontal plane across the lower surface of the pizza and then flows upwardly around the shielded peripheral edge 30 along flow lines indicated at 32. In this way at least the periphery of the pizza is heated almost entirely by hot air and without burning its edges or underheating the center. Because the base 22 has upwardly turned edges 33 at the periphery and at 24a around opening 24, it will also serve as a catch pan to collect drippings from the pizza.

By reference to FIG. 1 it will be noted that the ducted column of hot air passing upwardly through the opening 24 in the base 22 rises as indicated by the flow lines 26 and flows upwardly all the way to the top of the oven. In this instance the air flows solely through free convection produced by differences in air density resulting from temperature changes. However, during operation the rising column of air strikes the bottom surface of the pizza 19 at its center and with sufficient force to disrupt and reduce the adhered boundary layer air at that point. While the theory of operation of the present invention is not known with certainty, it is believed that the disruption of the boundary layer air facilitated by the impingement of the rising column 26 striking the lower surface of the pizza is effective in accelerating the heating at that point and thereby balancing the heating effectively between the center and the peripheral edge 30. It is also important however, to note that the peripheral edge 30 of the pizza is protected from direct infrared radiation emanating from the heat source 18 by the action of the base 22 which functions as a shield for reflecting the infrared radiation back toward the bottom of the oven as shown at 21 in FIG. 3.

Summarizing the method of operation as understood, it is applicant's belief that the adhered boundary air layer which normally exists on the bottom surface of the pizza 19 is disrupted and reduced by the impacting column 26 of rising air passing through aperture 24, and it is the combined reduction in the boundary layer together with the shielding of the periphery of the pizza which produces the desired uniform heating. By contrast, if the pizza is laid directly on the oven rack 14 without the use of the invention, the center of the pizza will remain relatively cool after a fairly long period of heating owing to the existence of a dead air spot near the center. It is well known that the resistance to heat flow across a boundary layer, e.g. a wall surrounded by hot air is affected substantially by the adhered boundary air layer. This air film factor or f value for a vertical wall will be about 0.68. For a top surface the value will be about 0.92 while on a bottom surface it will be about 0.61. Assuming an air stream strikes the surface at 570 ft./min. it drops to 0.25. It was discovered during operation of the present invention, the impact of the rising hot air column 26 provided by funneling air through the vent opening is apparently sufficient to break down this boundary layer air as it strikes the bottom surface of the pizza and then travels radially outward but upon reaching the periphery is cool enough so that it does not burn the edge. The radial risers help to assure smooth uniform flow of air toward the periphery.

While the dimensions of the appliance and the distances between the top and bottom are not utterly critical to the success of the invention, optimum performance is affected by these parameters. For example, in the case of a typical frozen pizza freshly removed from the freezer at a temperature of about 0° F. and placed in a 400° F. oven an inch or two above the baffle 22, the ratio of the diameter of the vent opening 24 to the pizza diameter should be from about $\frac{1}{2}$ to 4/5 and most preferably from about 0.6 to about 0.75 for best results. These parameters apply to each size of two or more appliances. The largest appliance has the largest size opening 24 and is used with the largest size pizza. A small appliance and opening 24 will be used with the small size pizza. Units of these sizes should cover the common sizes of pizza sold on the market. Assuming the pizza is placed on the appliance of the invention in a frozen condition and the oven is set at 400° F. with the pizza spaced $1\frac{1}{2}"$ above the baffle 22, the following dimensions apply:

For an 8" pizza, opening 24 should be $5\frac{1}{4}"$; for a 10" pizza, $7\frac{1}{4}"$; and for an $11\frac{1}{2}"$ pizza, $8\frac{1}{2}"$. These opening sizes are typical but optimum values will vary depending upon oven construction and temperature as well as the physical characteristics and temperature of the pizza, etc. The higher the pizza is raised above the baffle, the smaller the vent opening 24 need be to obtain optimum results.

Refer now to FIG. 3 which illustrates a preferred form of oven appliance in accordance with the present invention. As seen in the figure, the pizza 19 is supported throughout its entire width and breadth in a horizontal position on a support defined by the coplanar upper edges 27 of vertical risers or flanges 29. The risers are, in this case, plate-like vertically disposed radially arranged and extend upwardly from the baffle or base 22. The risers 29 are connected to the base 22 integrally by forming or molding. Some of the risers 29 extend close to the center while others extend only partially to the center (FIG. 4) thereby defining a horizontal food holder surface for supporting the pizza throughout its width and breadth, while at the same time facilitating cleaning between them since they are not too close together at the center to prevent the insertion of a brush or other cleaning device. The height of the risers or flanges 29 can be about an inch or an inch and a quarter. The unit 10 should have a diameter larger than the diameter of the pizza to be heated and can be injection molded, cast or stamped from a circular piece of sheet metal. When radially arranged, the risers not only support the pizza but also help guide the flow of air toward its periphery. This helps maintain a smooth uniform flow of air outwardly in all directions to assure uniform cooking without scorching at the edges. The risers 29 need not be plates or plate-like. If desired, the risers can comprise posts or pins 31 (FIG. 4) of any cross-section such as round, square, or oblong. If posts are used, they should be arranged in concentric circles having diameters that are different from the pizza diameter so that the drippings fall between the pins. This facilitates cleaning. The risers will not inhibit radial air flow as do the wires used in a wire cooking grill or grate which sometimes produce light and dark or burned areas corresponding to the pattern of the wires.

Figure 4:
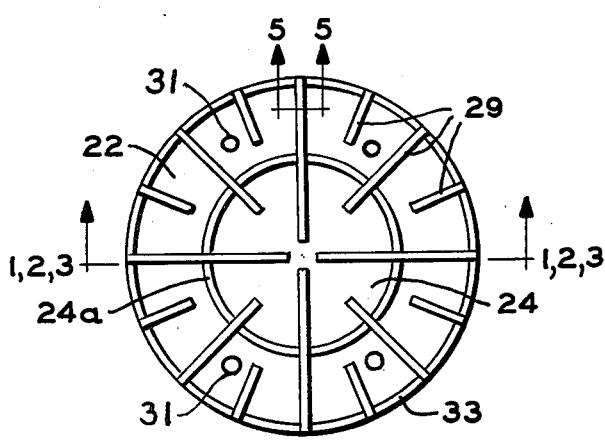
FIG. 4 is a plan view of the grill taken on line 4—4 of FIG. 3 on a reduced scale.
Figure 5:
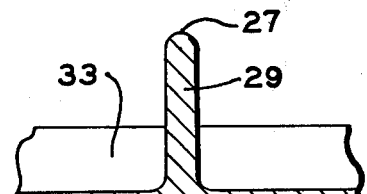
FIG. 5 is a vertical sectional view of the grill and baffle taken on line 5—5 of FIG. 4 on an enlarged scale.

Refer now to FIGS. 4 and 5. The plate-like risers 29 (sixteen of which are shown) each extend to the peripheral edge 33 and each is integral with the baffle 22 along its bottom edge. The risers 29 extend centrally into the opening 22. Four diametrically opposed risers almost touch at the center. Others need not extend to the center to provide uniform support. While radial webs or risers have been shown, sections can be provided with parallel risers if desired. More risers should be used with large size units and fewer are required with small units.

Figure 6:
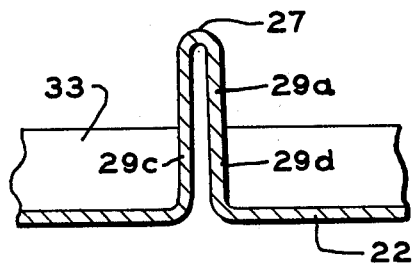
FIG. 6 is a vertical sectional view similar to FIG. 5 of another embodiment of the grill and baffle.

Refer now to FIG. 6 which illustrates a modified form of the invention. In this case, each riser 29a is an upwardly deflected portion of the baffle 22 formed, for example, by stamping a flat circular section of sheet metal to progressively raise webs in the previously flat sheet. This produces a riser having a U-shaped cross-section with a closed upper edge and parallel walls 29c and 29d.

It will be seen that the invention provides a number of important advantages. The uniformity of cooking or heating is the most important of these. In addition, the base 22 has radially arranged risers that can be used as a guide for scissors in cutting the pizza into equal portions before removal. Moreover, the base 22 will catch the drippings from the pizza and help to keep the oven clean. To facilitate cleaning, the upper surface of the base 22 can be coated with a release substance such as polytetrafouroethylene.

The circular centrally curved vertically extending faring 24 functions as a venturi located in the center of the base to help guide and confine the flow of the upwardly rising hot air that is caught by the baffle 22. The provision of a radius of curvature at the intersection between the faring 24a and the flat baffle helps the rising hot air make a smooth transition from beneath the baffle upwardly into the rising air column that strikes the center of the pizza. It is important to expose the entire lower surface of the pizza to free access to the air moving within the oven. The vent opening 24 at the center of the baffle 22 may be made with a faring 24a or not as desired. When the faring 24a (FIG. 3) is used, the hole may be made smaller than it would be without a fairing.

The appliance may be made of various materials but one preferred material comprises molded aluminum with a Teflon coating on its upper surface.

During use, the cooking time will of course be adjusted for the desired results in the particular oven being used. It has been found, however, that the cooking time should be about the same or slightly longer than the recommended cooking time for a pizza that is cooked directly on an oven rack. If a lightweight metal base is used having a gauge, say, of about 0.020 or 0.035" in thickness, the cooking times can be about the same as for a pizza cooked directly on an oven rack.

The risers 29 provide the same general function as the grill of my prior application, that is, to support the pizza uniformly throughout its width or breadth at a predetermined height above the baffle and hot air guide at its center. In addition they facilitate molding, casting or stamping the appliance in one piece, thereby lowering production costs while at the same time resulting in a product which has an attractive visual appearance and is easy to clean. Moreover, the one piece construction prevents separation of parts, a consumer advantage in some cases. The radial riser distribution assures a smoother, uniform flow of air.

What is claimed is:

1. An oven appliance for heating pizza comprising a base including a baffle with a vent opening of smaller cross sectional dimension than the diameter of the pizza, a plurality of upwardly extending risers integral with the baffle and having coplanar upper edges defining a pizza supporting surface above the base in a position to enable the pizza to be centered thereon directly over the vent opening in the baffle, the supporting surface being open to allow air to flow freely across the lower surface of the pizza, and the baffle serving as a shield means surrounding the vent opening and positioned below the support surface to shield the peripheral edge of the pizza from infrared radiation arising from beneath said baffle, the hot air rising through the vent opening will strike the center of the lower surface of the pizza to thereby disrupt and reduce stagnant boundary layer air whereby the pizza will be heated uniformly thereby.

2. The appliance of claim 1 wherein the risers are plate-like members integral with the baffle and supported thereby at their lower ends.

3. The appliance of claim 2 wherein the risers and baffle are formed from metal molded as one piece.

4. The appliance of claim 3 wherein the risers are radially arranged, extending outwardly from a center in alignment with the center of the vent opening.

5. The appliance of claim 3 wherein a centrally curved upwardly extending air guiding faring is provided around the periphery of the vent opening and integral with the baffle.

6. The appliance of claim 1 wherein the entire appliance is of one piece integral construction with said risers comprising radially arranged plates integral with the baffle at their lower edges and extending radially from a center and aligned with the center of the vent opening, an upwardly directed edge is provided around the vent opening and a second such edge is provided around the outer peripheral part of the baffle.

7. The appliance of claim 6 wherein the risers are of different lengths with some extending substantially to the center and some extending only part way to the center of the appliance to provide uniform support for the pizza and facilitate cleaning between them.

8. The appliance of claim 6 wherein the risers have the shape of an inverted U as seen in cross-section and each includes two parallel walls connected together at their upper edges.

9. The appliance of claim 8 wherein the risers are formed in the baffle by stamping a flat piece of sheet metal to define parallel walls connected at their upper edges.

10. The appliance of claim 5 wherein the appliance is formed from molded aluminum.

11. The appliance of claim 6 wherein the appliance is composed of molded metal at least partially covered with a food releasing coating.

12. The appliance of claim 11 wherein the coating is Teflon and the appliance is formed from aluminum.

13. The appliance of claim 1 wherein the risers comprise pins connected at their lower ends to the baffle and extending upwardly therefrom.

14. The appliance of claim 13 wherein the pins are arranged in a circle having a diameter different from said pizza whereby drippings fall between said pins.

* * * * *